United States Patent [19]
Sakata et al.

[11] Patent Number: 5,965,062
[45] Date of Patent: Oct. 12, 1999

[54] ELECTRICALLY-CONDUCTIVE POLYMER AND PRODUCTION METHOD THEREOF, AND SOLID-ELECTROLYTIC CAPACITOR

[75] Inventors: Koji Sakata; Toshihiko Nishiyama; Yuuji Aoki; Satoshi Arai; Kenji Araki, all of Toyama, Japan

[73] Assignee: NEC Corporation, Tokyo, Japan

[21] Appl. No.: 08/910,423

[22] Filed: Aug. 13, 1997

[30] Foreign Application Priority Data

Aug. 16, 1996 [JP] Japan ..................... 8-216289

[51] Int. Cl.⁶ .............. H01B 1/00; H01G 9/028
[52] U.S. Cl. .......... 252/500; 528/377; 528/422; 528/423; 528/491; 361/525
[58] Field of Search ................ 528/422, 423, 528/486, 491; 525/540; 252/500

[56] References Cited

U.S. PATENT DOCUMENTS

| 4,935,163 | 6/1990 | Cameron . | |
|---|---|---|---|
| 5,160,457 | 11/1992 | Elsenbaumer . | |
| 5,403,913 | 4/1995 | MacDiaruid et al. | 528/422 |
| 5,422,423 | 6/1995 | Shacklette et al. . | |
| 5,436,796 | 7/1995 | Abe et al. | 361/525 |
| 5,736,623 | 4/1998 | Angelopoulos et al. | 528/422 |

FOREIGN PATENT DOCUMENTS

| 1-100911 | 4/1989 | Japan . |
|---|---|---|
| 1-170616 | 7/1989 | Japan . |
| 2-58817 | 2/1990 | Japan . |
| 2-249222 | 10/1990 | Japan . |
| 3-35516 | 2/1991 | Japan . |
| 3-146687 | 6/1991 | Japan . |
| 4-87317 | 3/1992 | Japan . |
| 5-21281 | 1/1993 | Japan . |
| 5-129162 | 5/1993 | Japan . |
| 6-29159 | 2/1994 | Japan . |
| 6-112094 | 4/1994 | Japan . |
| 6-313038 | 11/1994 | Japan . |
| 7-165892 | 6/1995 | Japan . |

OTHER PUBLICATIONS

Alex K.Y. Jen et al., Highly Conducting and Thermal Stable Conjugated Polymers, Materials Research Society Symp. Proc., vol. 247, (1992), EX–002067313, pp. 687–692.

V.T. Truong et al., "Enhanced Thermal Properties and Morphology of Ion–Exchanged Polypyrrole Films", Polymer, vol. 36, No. 10, (1995), XP–002067314, pp. 1933–1940.

Derwent Publications Ltd., XP–002067315, Feb. 4, 1994.

Primary Examiner—Tae Yoon
Attorney, Agent, or Firm—Sughrue, Mion, Zinn, Macpeak & Seas, PLLC

[57] ABSTRACT

An electrically-conductive polymer having an improved heat resistance is provided. This polymer contains an electrically-conductive polymer matrix, a multivalent proton acid, and an aromatic compound. The cleavage reaction of the main chain of the electrically-conductive polymer matrix is suppressed. As the polymer matrix, a polymer of pyrrole, thiophene, or aniline, or one of derivatives of pyrrole, thiophene, or aniline is preferably used. As the multivalent proton acid, a proton acid having two or more hydrogen atoms such as sulfuric acid, citric acid, salicylic acid, oxalic acid, and phthalic acid in each molecule is preferably used. As the aromatic compound, a sulfonic acid having at least one sulfonic group in each molecule such as p-toluensulfonic acid, p-ethylbenzenesulfonic acid, p-pentylbenzenesulfonic acid, p-octylbenzenesulfonic acid, p-decylbenzenesulfonic acid, p-dodecylbenzenesulfonic acid, 1-naphthalenesulfonic acid, 2-naphthalenesulfonic acid, and butyl naphthalenesulfonic acid is preferably used.

9 Claims, 1 Drawing Sheet

ELECTRICALLY-CONDUCTIVE POLYMER AND PRODUCTION METHOD THEREOF, AND SOLID-ELECTROLYTIC CAPACITOR

BACKGROUND OF THE INVENTION

1. Field of the Invention

The present invention relates to an electrically-conductive polymer used for electronic devices such as batteries, capacitors, diodes, indicator elements, and sensors, a production method of the polymer, and a solid-electrolytic capacitor using the polymer as an electrically conductive layer.

2. Prior Art

In general, an electrically-conductive polymer of this sort is produced by adding a dopant to a polymer produced by chemically-oxidative polymerization of a chemical compound having $\pi$ electrons.

For example, in the Japanese Non-Examined Patent Publication Nos. 64-74711, 64-74712, and 64-74713, which were published in 1989, typical examples of the conventional production methods of a solid-electrolyte capacitor are disclosed. With these conventional methods, an electrically-conductive polymer film is formed on an oxide film of a film-formation metal by chemical polymerization of a proper monomer using an oxidizing agent. The electrically-conductive polymer film may be formed by electrolytically oxidative polymerization of a proper monomer. This electrically-conductive polymer film, which is produced by a chemical polymerization using an oxidizing agent or electrolytically oxidative polymerization, is in a highly oxidized state where anions are doped into the polymer. Thus, the electrical conductivity tends to deteriorate due to heat because of its structural change and therefore, it is difficult to maintain the initial electrical conductivity stably over a long period of time. This fact has been known well.

In recent years, in the field of solid-electrolytic capacitors, it has been noticed that the electrically-conductive polymer is superior in electrical conductivity when compared to such a substance as manganese dioxide that has been widely used as a solid electrolyte. Thus, various active researches and developments have been made to improve the capacitor characteristics including the solution of the above problem of electrical conductivity deterioration at a high temperature.

For example, in the Japanese Non-Examined Patent Publication Nos. 4-48710 published in 1992, 2-58817 published in 1990, and 5-217808 published in 1993, improved capacitors are disclosed, each of which uses an electrically-conductive polymer containing a suitable aromatic sulfonic acid or its salt. These capacitors were developed for the purpose of preventing the electrical conductivity of an electrically-conductive polymer film from lowering at a high temperature. With the conventional electrically-conductive polymer containing an aromatic sulfonic acid or its salt, the aromatic sulfonic acid or its salt serving as a dopant has a high molecular weight and therefore, this dopant is difficult to be desorbed or released from the main chain of the electrically-conductive polymer even at a high temperature. As a result, this electrically-conductive polymer has a better heat resistance as compared to that of the other electrically-conductive polymers.

In the Japanese Non-Examined Patent Publication Nos. 5-129162 published in 1993 and 3-35516 published in 1991, improved capacitors are disclosed, each of which uses an electrically-conductive polymer containing an anion of a proper proton acid. In general, an electrically-conductive polymer containing an anion of a proton acid has a so-called "self-repairing function" and a low electrical-impedance characteristic in a high-frequency region. The "self-repairing function" is a function or capability that reoxidizes a defective portion of an oxide film of a film-formation metal in a solid-electrolyte capacitor to thereby decrease a leakage electric-current of the capacitor.

Especially, the electrically-conductive polymer disclosed in the Japanese Non-Examined Patent Publication No. 3-35516 is soluble in an organic solvent in the state where the dopant is desorbed or removed, and it develops electrical conductivity by means of doping a proton acid having a pKa value of 4.8 or less thereinto. This polymer makes it possible not only to decrease the electrical impedance of a capacitor in a high-frequency region but also to enable the formation of an electrically-conductive layer by means of a coating process Therefore, this polymer facilitates simplification of the production processes of the capacitor.

Any one of the proton acids mentioned in the above Japanese Non-Examined Patent Publication Nos. 5-129162 and 3-35516 is a monovalent proton acid, which emits a single proton per molecule.

In the Japanese Non-Examined Patent Publication No. 1-100911 published in 1989, a method of forming an electrically-conductive polymer layer on an oxide film by a two-step polymerization technique is disclosed. With this method, a solution containing an oxidizing agent such as bichromic acid, persulfuric acid, and permanganic acid is used at the first stage of polymerization, thereby forming a part of the electrically-conductive polymer layer by electrolytic polymerization. Then, at the second stage of the polymerization, the remaining part of the electrically-conductive polymer is formed by electrolytic or chemical polymerization.

When the second stage of the polymerization is performed by electrolytic polymerization, a liquid electrolyte containing $R_{4-x}MH_x$ or $R_3M'$ is used, where R is an alkyl group of $C_1$ to $C_{10}$, or an aryl group such as phenyl and alkylphenyl, M is N, P, or As, and M' is O or S, and x is 0 or 1. On the other hand, when the second stage of the polymerization is performed by chemical polymerization, an acid such as persulfuric acid, perboric acid, and permanganic acid, or its alkali or ammonium salt is used as an oxidizing agent.

The two-step polymerization technique disclosed in the Japanese Non-Examined Patent Publication No. 1-100911 makes it possible to uniformly form an electrically-conductive polymer layer on the underlying oxide film without damage of the oxide film. Further, this technique enables uniform formation of an electrically-conductive polymer layer even on an fine-etching-induced pit area in an aluminum electrolytic capacitor, for example.

As described above, in the field of solid-electrolytic capacitors, a large number of researches and developments have been performed to improve the characteristics of the electrically-conductive polymer serving as a solid electrolyte.

An electrically-conductive polymer containing an aromatic sulfonic acid with a high molecular weight or its salt makes it possible to prevent its electrical-conductivity deterioration at a high temperature, as disclosed in the Japanese Non-Examined Patent Publication Nos. 4-48710, 2-58817, and 5-217808. However, this polymer has a problem that the ability of maintaining the initial electrical conductivity for a long period of time is not satisfactory in the typical range of the service temperature and humidity for an electronic device, especially in a high-temperature atmosphere.

Specifically, with the electrically-conductive polymer containing an aromatic sulfonic acid with a high molecular weight or its salt, the high-temperature electrical-conductivity deterioration is able to be suppressed, which results from a main cause (a) that the dopant is desorbed or released from the main chain of this electrically-conductive polymer However, the main-chain cleavage of this polymer due to oxygen-addition reaction, which is another main cause (b) for the high-temperature electrical-conductivity deterioration, cannot be suppressed. Therefore, it is difficult for this polymer to resist the deterioration with time due to the latter cause (b) to maintain the initial electrical conductivity for a long period of time

SUMMARY OF THE INVENTION

Accordingly, an object of the present invention is to provide an electrically-conductive polymer having an improved heat resistance, and a production method of the polymer.

Another object of the present invention is to provide an electrically-conductive polymer that suppresses the cleavage reaction of the main chain of the polymer, and a production method of the polymer.

Still another object of the present invention is to provide a solid-electrolyte capacitor that is superior in reliability.

The above objects together with others not specifically mentioned will become clear to those skilled in the art from the following description.

According to a first aspect of the present invention, an electrically-conductive polymer is provided, which contains an electrically-conductive polymer matrix, a multivalent proton acid, and an aromatic compound.

With the electrically-conductive polymer according to the first aspect of the present invention, an aromatic compound and a multivalent proton acid that emits two or more protons per molecule are doped into an electrically-conductive polymer matrix. The aromatic compound is difficult to be desorbed or released from the electrically-conductive polymer matrix. At the same time, the cleavage of the main chain of the polymer matrix is suppressed by the high proton-supplying capacity of the multivalent proton acid.

Consequently, a highly heat-resistant electrically-conductive polymer is provided, which has a small time-dependent degradation in electrical conductivity at a high temperature.

According to a second aspect of the present invention, a production method of an electrically-conductive polymer is provided, which includes a step of preparing a solution containing an electrically-conductive monomer matrix, a multivalent proton acid, and an aromatic compound, and a step of polymerizing the monomer matrix by chemically oxidative polymerization or electrolytically oxidative polymerization in the solution.

With the production method of an electrically-conductive polymer according to the second aspect of the present invention, the electrically-conductive polymer is produced by chemically oxidative polymerization or electrolytically oxidative polymerization in a solution containing a multivalent proton acid and an aromatic compound. Therefore, the highly heat-resistant electrically conductive polymer according to the first aspect is produced with ease.

According to a third aspect of the present invention, a solid-electrolyte capacitor is provided, which includes a capacitor element having an anode body, a dielectric film made of an anodic oxide formed on the body, and an electrically-conductive polymer film serving as a solid electrolyte formed on the dielectric film. The electrically-conductive polymer contains an electrically-conductive polymer matrix, a multivalent proton acid, and an aromatic compound.

With the solid-electrolyte capacitor according to the third aspect of the present invention, an electrically conductive polymer according to the first aspect is used as a solid electrolyte for a solid electrolytic capacitor. Therefore, the change in equivalent series resistance is kept small over a long period of time in a high-temperature atmosphere. This means that a highly-reliable solid-electrolytic capacitor can be realized.

DETAILED DESCRIPTION OF THE INVENTION

To solve the above-stated problem of the time-dependent deterioration of the electrical conductivity due to the above cause (b), the inventors enthusiastically made research and development concerning electrically-conductive polymers to improve their heat resistance. As a result of this, they created the present invention.

As already described above, the electrically-conductive polymer according to the first aspect of the present invention contains an electrically-conductive polymer matrix, a multivalent proton acid, and an aromatic compound.

In the polymer according to the first aspect, any electrically-conductive polymer may be used as the polymer matrix. However, a polymer of pyrrole, thiophene, or aniline, or one of derivatives of pyrrole, thiophene, or aniline may be preferably used, because these polymers are superior in heat resistance and electrical conductivity.

As the multivalent proton acid, any acid emitting two or more protons per molecule may be used. In other words, any acid having two or more hydrogen atoms in each molecule may be used. For example, sulfuric acid, citric acid, salicylic acid, oxalic acid, and phthalic acid are preferably used, because these acids effectively suppress the desorption or release of the protons from the main chain of the matrix.

As the aromatic compound, any one of aromatic compounds may be used. However, any one of sulfonic acids having at least one sulfonic group in each molecule is preferably used, because sulfonic acids have a high molecular weight (i.e., a large molecular size) enough for suppressing the dopant to be desorbed or released from the main chain of the polymer matrix.

For example, p-toluensulfonic acid, p-ethylbenzenesulfonic acid, p-pentylbenzenesulfonic acid, p-octylbenzenesulfonic acid, p-decylbenzenesulfonic acid, p-dodecylbenzenesulfonic acid, 1-naphthalenesulfonic acid, 2-naphthalenesulfonic acid, and butyl naphthalenesulfonic acid are preferably used, because these acids are readily available.

The electrically-conductive polymer according to the first aspect of the present invention has a high heat-resistance the electrical conductivity of which is extremely low at a high temperature. The reason why the electrically-conductive polymer of the present invention has a high heat-resistance is that not only (a) the desorption or release of the dopant but also (b) the main-chain cleavage of the polymer matrix can be simultaneously suppressed. This is a result of the inventors' finding that an aromatic compound having a high molecular weight such as aromatic sulfonic acid is effectively used as a measure against the former cause (a), and a multivalent proton acid is effectively used as a measure against the latter cause (b).

The multivalent proton acid provides the following functions or effects. Specifically, the oxidation-induced deterioration of the electrical conductivity is started with the proton-desorption reaction from the main chain of the electrically-conductive polymer matrix due to oxygen radicals existing in an atmosphere, and is finally caused by the cleavage of the main chain. In the present invention, the initial electrical conductivity is maintained independent of time passing based on the concept that the protons doped into the polymer matrix suppress the proton-desorption reaction to thereby prevent the electrical conductivity from degrading with time. Therefore, the "multivalence" of the proton acid, each molecule of which emits a plurality of protons, gives a conspicuous effect.

The highly heat-resistant electrically-conductive polymers according to the first aspect of the present invention is readily obtained by the production method according to the second aspect of the present invention, which polymerize the monomer matrix in a definite solution containing a multivalent proton acid through chemically oxidative polymerization or electrolytically oxidative polymerization.

BRIEF DESCRIPTION OF THE DRAWINGS

In order that the invention may be readily carried into effect, it will now be described with reference to the accompanying drawings.

EXAMPLES

Figure 1:
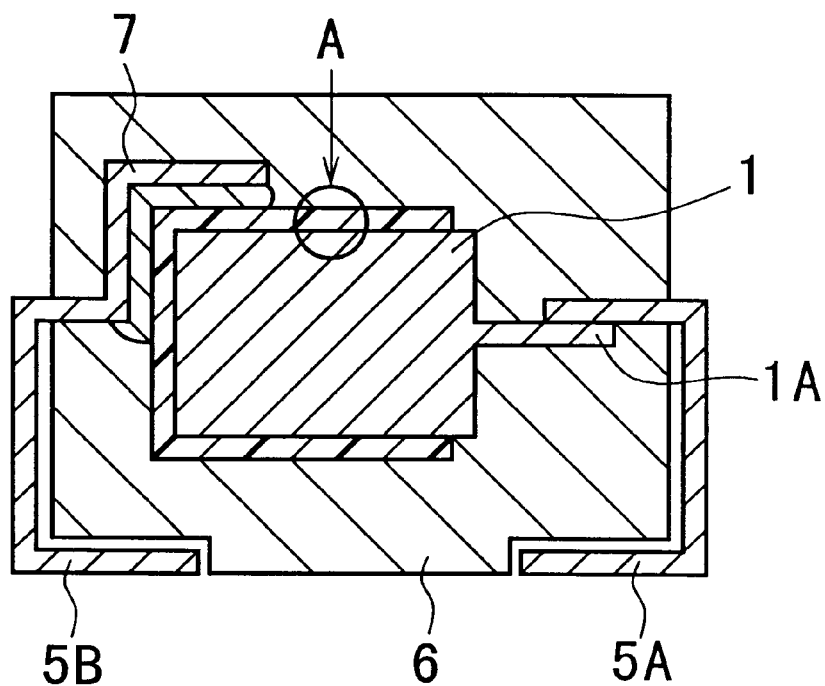
FIG. 1 is a schematic cross-sectional view of a solid-electrolyte capacitor according to an embodiment of the present invention.

By using the following examples of the present invention and comparative examples, the present invention will be described in detail below.

Example 1

First, a water solution of 0.1-mole (M) pyrrole, 0.1-M citric acid, and 0.1-M p-toluensulfonic acid was prepared. Next, using a pair of stainless-steel plate electrodes (5 cm×5 cm in size) as a work electrode and an opposite electrode, electrolysis of the water solution was carried out for 20 minutes at a constant electric current of 2 mA. Thus, a polypyrrole film with a thickness of 0.02 mm was produced by electrolytic polymerization on one of the pair of electrodes.

After the electrolysis was completed, the polypyrrole film thus produced was cleaned with water and aceton. Then, the polypyrrole film thus cleaned was peeled off from the electrode and was dried for 12 hours in vacuum.

Thereafter, a circular piece of 10 mm in diameter was cut out from the polypyrrole film. The electric resistance of this circular piece was measured by the standard four-probe method and calculated the electrical conductivity of the piece.

Subsequently, the circular piece of the polypyrrole film was heated in the air at 150° C. for 100 hours, and then, the same standard four-probe method was carried out to measure the electric resistance of the piece and calculated the electrical conductivity thereof.

As a result, it was confirmed that the degradation in electrical conductivity due to the heating process was small, and the electrical conductivity after the heating process was held at approximately 80% of the initial value. Thus, high thermal stability of the electrical conductivity was confirmed.

Comparative Example 1

A polypyrrole film was produced under the same conditions as those in the above example 1, except that a water solution of 0.1-M pyrrole and 0.1-M p-toluensulfonic acid was used, instead of the water solution of pyrrole, citric acid, and p-toluensulfonic acid in the above example 1.

Next, by taking the same procedure as that in the example 1, a sample of the polypyrrole film for resistance measurement was prepared and used for examining the electrical conductivity before and after the heating process.

As a result, it was confirmed that the electrical conductivity was lowered down to approximately 10% of the initial value after a heating process for 20 hours, and that the electrical conductivity of the polypyrrole film was therefore deteriorated drastically due to heating.

Example 2

A polypyrrole film was produced under the same conditions as those in the example 1, except that a water solution of 0.1-M pyrrole, 0.1-M salicylic acid, and 0.1-M 2-naphthalenesulfonic acid was used. Then, by taking the same procedure as that in the example 1, a sample of the polypyrrole film for resistance measurement was prepared and used for examining the electrical conductivity before and after the heating.

As a result, it was confirmed that the change in electrical conductivity due to the heating was small, that the electrical conductivity after the heating process was held at approximately 85% of the initial value, and that the thermal stability was therefore high.

Comparative Example 2

A polypyrrole film was produced under the same conditions as those in the example 2, except that a water solution of 0.1-M pyrrole and 0.1-M 2-naphthalenesulfonic acid was used. Then, by taking the same procedure as that in the example 2, a sample of the polypyrrole film was prepared and used for examining the electrical conductivity before and after the heating process.

As a result, it was confirmed that the electrical conductivity was lowered down to approximately 20% of the initial value in 20 hours after the heating, and that the electrical conductivity of the polypyrrole was therefore deteriorated due to heating.

Example 3

A polythiophene film was produced under the same conditions as those in the example 1, except that an ethanol solution of 0.1-M thiophene, 0.1-M salicylic acid, and 0.1-M 2-naphthalenesulfonic acid was used.

Then, by taking the same procedure as that in the example 1, a sample of the polythiophene film was prepared and used for examining the electrical conductivity before and after the heating.

As a result, it was confirmed that the change in electrical conductivity due to the heating is small, that the electrical conductivity after the heating was held at approximately 85% of the initial value, and that the thermal stability was therefore high.

Comparative Example 3

A polythiophene film was produced under the same conditions as those in the example 3, except that an ethanol solution of 0.1-M thiophene and 0.1-M 2-naphthalenesulfonic acid was used.

Then, by taking the same procedure as that in the example 3, a sample of the polythiophene film was prepared and used for examining the electrical conductivity before and after the heating.

As a result, it was confirmed that the electrical conductivity was lowered down to approximately 18% of the initial value in 20 hours after the heating, and that the electrical conductivity of the polythiophene was therefore deteriorated by heating.

Example 4

(i) A methanol solution of pyrrole, (ii) a methanol solution of citric acid and naphthalenesulfonic acid, and (iii) a methanol solution of iron nitrate were prepared, and held at −40° C., respectively. Then, these methanol solutions were formulated at −40° C. so that a mixed methanol solution of a 0.1-M pyrrole, 0.1-M citric acid, 0.1-M 2-naphthalenesulfonic acid, and 0.2-M iron nitrate was produced as a polymer solution, and then, thoroughly stirred.

Thereafter, this methanol solution was left at room temperature for 3 hours to be polymerized by chemical polymerization. Further, surplus pyrrole, citric acid, naphthalenesulfonic acid, and iron nitrate in this solution were removed by using methanol, thereby producing a powder of polypyrrole.

Further, this powder of polypyrrole was compacted to form a sample of a rectangular parallelepiped of 2 cm×1 cm×0.2 cm. Then, in the same way as that in the example 1, the standard four-probe method was carried out to examine the electrical conductivity before and after the heating of the chemically-polymerized polypyrrole.

As a result, it was confirmed that the change in electrical conductivity due to the heating is small, that the electrical conductivity after the heating was held at approximately 75% of the initial value, and that the thermal stability was thus high.

Comparative Example 4

A polypyrrole film was produced under the same conditions as those in the example 4, except that a methanol solution of 0.1-M pyrrole, 0.1-M 2-naphthalenesulfonic acid, and 0.2-M iron nitrate was used.

Then, by taking the same procedure as that in the example 4, a sample of the polypyrrole film was prepared and used for examining the electrical conductivity before and after the heating.

As a result, it was confirmed that the electrical conductivity was lowered down to approximately 8% of the initial value in 20 hours after the heating, and that the electrical conductivity of the polypyrrole was therefore deteriorated by heating.

Example 5

Figure 2:
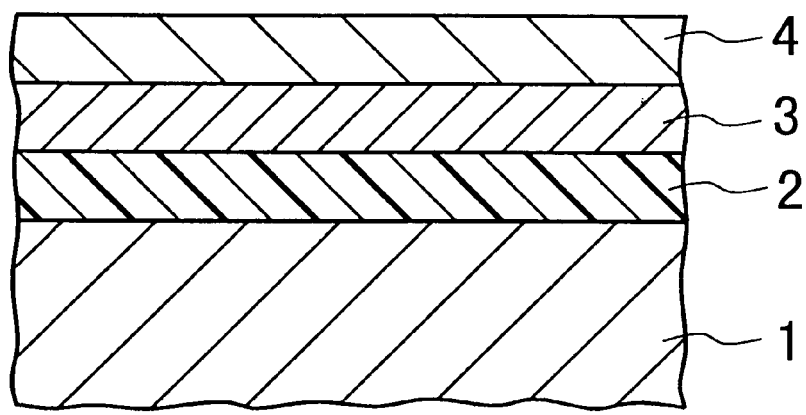
FIG. 2 is an enlarged, partial cross-sectional view of the capacitor according to the embodiment of the present invention, which shows a part A in FIG. 1.

A tantalum solid-electrolytic capacitor as shown in FIGS. 1 and 2 was produced through the following processes.

A cylindrical pellet or capacitor element 1 with a length of 1 mm and a diameter of 1 mm was formed by sintering a fine tantalum powder. A tantalum wire 1A with a diameter of 0.2 mm was implanted into the top of the element 1 as an anode lead. The element 1 had a CV product, i.e., the product of capacitance ($\mu$F per 1 g) and the anodizing voltage (V), of 23,000 $\mu$F·V/g.

The element or pellet 1 was then anodized at 60 V in a water solution of 0.1-wt % nitric acid, thereby forming a tantalum oxide film 2 on the whole surface of the pellet 1.

Then, after this oxidized pellet 1 was immersed into a same polymer solution as used in the example 4 for one minute, the pellet 1 was held for 30 minutes in the air, thereby chemically-oxidative polymerizing the pyrrole. These processes of immersion and chemically oxidative polymerization were repeated five times to thereby form a black polypyrrole film serving as an electrically-conductive polymer layer 3 on the tantalum oxide film 2.

Further, an electrically-conductive layer 4 (for example, a graphite layer or a silver paste layer) was formed on the electrically-conductive polymer layer 3. Thus, the capacitor element 1 was completed.

Subsequently, an external electrode, i.e., anode 5A was mechanically and electrically connected to the anode lead 1A, and another external electrode, i.e., cathode 5B was mechanically and electrically connected to the electrically-conductive layer 4 through an electrically conductive adhesive 7.

Finally, the capacitor element 1 was encapsulated by a synthetic resin to form a plastic package 6. Thus, the solid-electrolytic capacitor as shown in FIGS. 1 and 2 was completed.

The equivalent series resistance (ESR) of the completed solid-electrolytic capacitor at a frequency of 100 kHz was measured before and after the heating process at 125° C. for 500 hours. As a result, it was confirmed that the ESR change due to the heating was small, and that the ESP was held at approximately 1.05 times the initial value, and thus, the thermal stability was high.

Comparative Example 5

A solid electrolytic capacitor was fabricated under the same conditions as those in the example 5, except that the solution used in the comparative example 4 was employed.

The ESP of the fabricated solid-electrolytic capacitor at a frequency of 100 kHz was measured before and after the heating at 125° C. for 500 hours. As a result, it was confirmed that the ESR change due to the heating is great, and that the ESR value was increased to approximately 2.0 times the initial value, and thus the ESR value is deteriorated by heating.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. An electrically-conductive polymer comprising:
    an electrically-conductive polymer matrix;
    a multivalent proton acid selected from the group consisting of citric acid and salicylic acid; and
    an aromatic compound selected from the group consisting of p-toluensulfonic acid, p-ethylbenzenesulfonic acid, p-pentylbenzenesulfonic acid, p-octylbenzenesulfonic acid, p-decylbenzenesulfonic acid, p-dodecylbenzenesulfonic acid, 1-naphthalenesulfonic acid, 2-naphthalenesulfonic acid, and butyl naphthalenesulfonic acid;
    wherein a cleavage reaction of a main chain of said electrically-conductive polymer matrix is suppressed.

2. A polymer as claimed in claim 1, wherein said electrically-conductive polymer matrix is a polymer of one selected from the group consisting of pyrrole, thiophene, and aniline.

3. A production method of an electrically-conductive polymer, comprising the steps of:

preparing a solution containing an electrically-conductive monomer matrix, a multivalent proton acid selected from the group consisting of citric acid and salicylic acid, and an aromatic compound selected from the group consisting of p-toluensulfonic acid, p-ethylbenzenesulfonic acid, p-pentylbenzenesulfonic acid, p-octylbenzenesulfonic acid, p-decylbenzenesulfonic acid, p-dodecylbenzenesulfonic acid, 1-naphthalenesulfonic acid, 2-naphthalenesulfonic acid, and butyl naphthalenesulfonic acid; and polymerizing said monomer by chemically oxidative polymerization in said solution, thereby producing an electrically-conductive polymer of said monomer;

wherein said electrically-conductive polymer contains an electrically-conductive polymer matrix, said multivalent proton acid; and said aromatic compound;

and wherein a cleavage reaction of a main chain of said electrically-conductive polymer matrix is suppressed.

4. A method as claimed in claim 3, wherein said electrically-conductive polymer matrix is a polymer of one selected from the group consisting of pyrrole, thiophene, and aniline.

5. A production method of an electrically-conductive polymer, comprising the steps of:

preparing a solution containing an electrically-conductive monomer matrix, a multivalent proton acid selected from the group consisting of citric acid and salicylic acid, and an aromatic compound selected from the group consisting of p-toluensulfonic acid, p-ethylbenzenesulfonic acid, p-pentylbenzenesulfonic acid, p-octylbenzenesulfonic acid, p-decylbenzenesulfonic acid, p-dodecylbenzenesulfonic acid, 1-naphthalenesulfonic acid, 2-naphthalenesulfonic acid, and butyl naphthalenesulfonic acid; and polymerizing said monomer by electrolytically oxidative polymerization in said solution, thereby producing an electrically-conductive polymer of said monomer;

wherein said electrically-conductive polymer contains an electrically-conductive polymer matrix, said multivalent proton acid; and said aromatic compound;

and wherein a cleavage reaction of a main chain of said electrically-conductive polymer matrix is suppressed.

6. A method as claimed in claim 5, wherein said electrically-conductive polymer matrix is a polymer of one selected from the group consisting of pyrrole, thiophene, and aniline.

7. A solid-electrolyte capacitor comprising:

a capacitor element having an anode body;

a dielectric film made of anodic-oxide formed on said body; and an electrically conductive polymer film serving as a solid electrolyte formed on said dielectric film;

wherein said electrically-conductive polymer contains an electrically-conductive polymer matrix, a multivalent protonic acid selected from the group consisting of citric acid and salicylic acid; and an aromatic compound selected from the group consisting of p-toluensulfonic acid, p-ethylbenzenesulfonic acid, p-pentylbenzenesulfonic acid, p-octylbenzenesulfonic acid, p-decylbenzenesulfonic acid, p-dodecylbenzenesulfonic acid, 1-naphthalenesulfonic acid, 2-naphthalenesulfonic acid, and butyl naphthalenesulfonic acid;

and wherein a cleavage reaction of a main chain of said electrically-conductive polymer matrix is suppressed.

8. A polymer as claimed in claim 1, wherein said electrically-conductive polymer is prepared by polymerizing an electrically-conductive monomer matrix in a solution containing said multivalent proton acid and said aromatic compound.

9. A solid-electrolyte capacitor as claimed in claim 7, wherein said electrically-conductive polymer is prepared by polymerizing an electrically-conductive monomer matrix in a solution containing said multivalent proton acid and said aromatic compound.

* * * * *